United States Patent
Airamo et al.

(10) Patent No.: US 11,005,659 B2
(45) Date of Patent: May 11, 2021

(54) PROTOCOL INDEPENDENT FORWARDING OF TRAFFIC FOR CONTENT INSPECTION SERVICE

(71) Applicant: Forcepoint LLC, Austin, TX (US)

(72) Inventors: Otto Airamo, Helsinki (FI); Tuomo Syvänne, Helsinki (FI); Ville Mattila, Helsinki (FI)

(73) Assignee: Forcepoint LLC, Austin, TX (US)

(*) Notice: Subject to any disclaimer, the term of this patent is extended or adjusted under 35 U.S.C. 154(b) by 258 days.

(21) Appl. No.: 15/877,974

(22) Filed: Jan. 23, 2018

(65) Prior Publication Data
US 2019/0229923 A1   Jul. 25, 2019

(51) Int. Cl.
*H04L 9/32* (2006.01)
*H04L 29/06* (2006.01)
*H04L 29/08* (2006.01)
*H04L 9/14* (2006.01)

(52) U.S. Cl.
CPC .............. *H04L 9/3226* (2013.01); *H04L 9/14* (2013.01); *H04L 63/0281* (2013.01); *H04L 63/0428* (2013.01); *H04L 63/20* (2013.01); *H04L 67/141* (2013.01); *H04L 67/28* (2013.01); *H04L 67/42* (2013.01); *H04L 69/161* (2013.01)

(58) Field of Classification Search
CPC ................................. H04L 9/3226; H04L 9/14
USPC ......................................................... 713/161
See application file for complete search history.

(56) References Cited

U.S. PATENT DOCUMENTS

| | | | |
|---|---|---|---|
| 6,415,313 B1* | 7/2002 | Yamada | H04L 45/54 370/332 |
| 7,032,111 B1* | 4/2006 | Ruutu | H04L 29/06 380/29 |
| 2006/0085850 A1* | 4/2006 | Mayfield | G06F 21/335 726/14 |
| 2014/0351573 A1* | 11/2014 | Martini | H04L 63/0428 713/153 |

* cited by examiner

*Primary Examiner* — Anthony D Brown
(74) *Attorney, Agent, or Firm* — Jackson Walker L.L.P.

(57) ABSTRACT

A method, system, and computer-usable medium are disclosed for, responsive to an attempted connection from a client to a server for establishing communications between the client and the server, redirecting the connection to a proxy and injecting protocol-independent header information into a datagram of the traffic between the client and the server, the protocol-independent header information including information based upon which the proxy enforces a security policy.

18 Claims, 3 Drawing Sheets

PROTOCOL INDEPENDENT FORWARDING OF TRAFFIC FOR CONTENT INSPECTION SERVICE

FIELD OF DISCLOSURE

The present invention relates in general to the field of computers and similar technologies, and in particular to software utilized in this field. Still more particularly, it relates to a method, system, and computer-usable medium for performing protocol independent forwarding of traffic for a content inspection service.

BACKGROUND

In many instances, an enterprise of networked computers may desire to perform an application filtering solution that offers more granular configuration and more detailed reports than a typical firewall solution. Often, it is desirable for this application filtering to be performed by a proxy external to the firewall wherein the proxy executes a content inspection service. Such proxy may be implemented with an external cloud service, another network external to that in which the firewall resides (e.g., remote site owned and maintained by the enterprise), or within the network in which the firewall resides. It is also desirable that such solution work with both unencrypted and encrypted network traffic, and such that a particular proxy is used regardless of setting of a client computer sending or receiving the traffic. Further, in many instances, it is critical that unencrypted user information and end point information is not communicated over a network. Existing network security solutions do not adequately satisfy these desires.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include, responsive to an attempted connection from a client to a server for establishing communications between the client and the server, redirecting the connection to a proxy and injecting protocol-independent header information into a datagram of the traffic between the client and the server, the protocol-independent header information including information based upon which the proxy enforces a security policy.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for, responsive to an attempted connection from a client to a server for establishing communications between the client and the server, redirecting the connection to a proxy and injecting protocol-independent header information into a datagram of the traffic between the client and the server, the protocol-independent header information including information based upon which the proxy enforces a security policy.

In accordance with these and other embodiments of the present disclosure, a non-transitory, computer-readable storage medium may embody computer program code, the computer program code comprising computer executable instructions configured for, responsive to an attempted connection from a client to a server for establishing communications between the client and the server, redirecting the connection to a proxy and injecting protocol-independent header information into a datagram of the traffic between the client and the server, the protocol-independent header information including information based upon which the proxy enforces a security policy.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregation of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
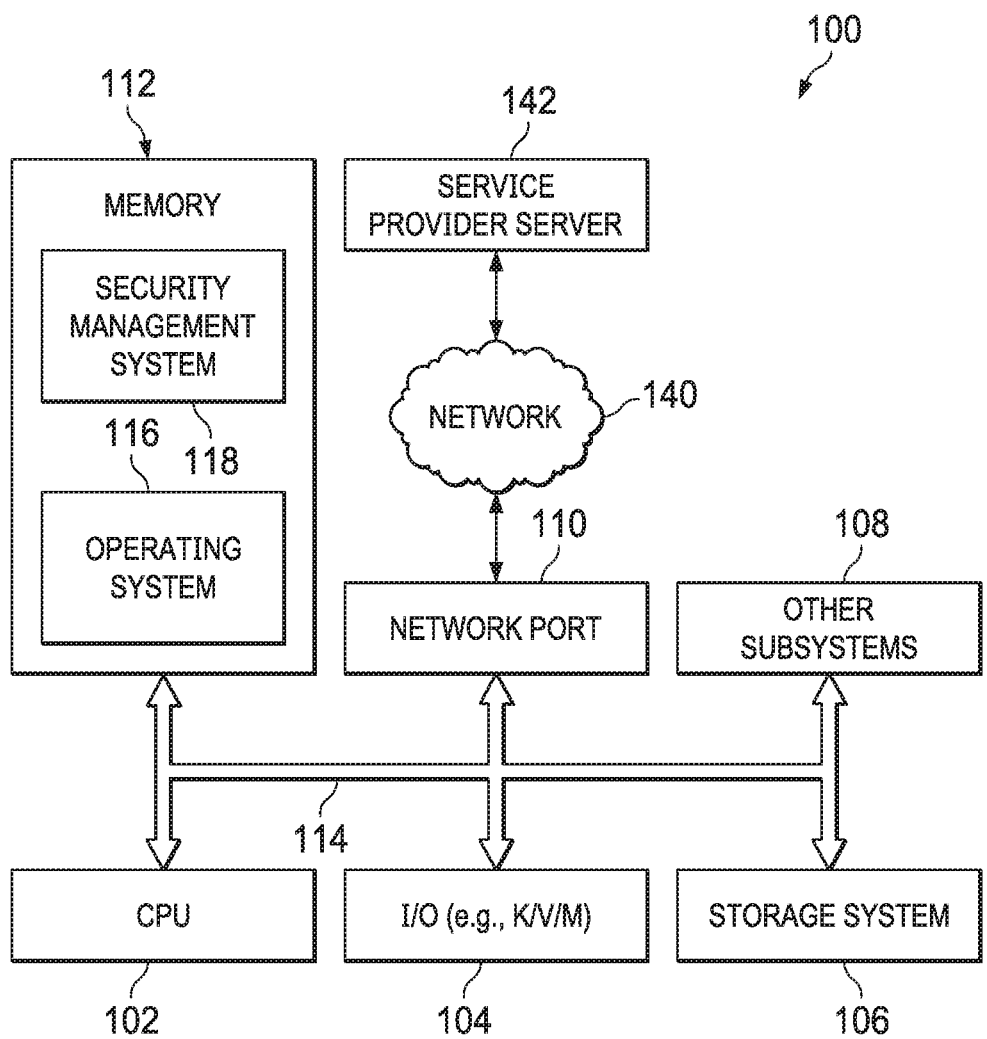
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

Figure 2:
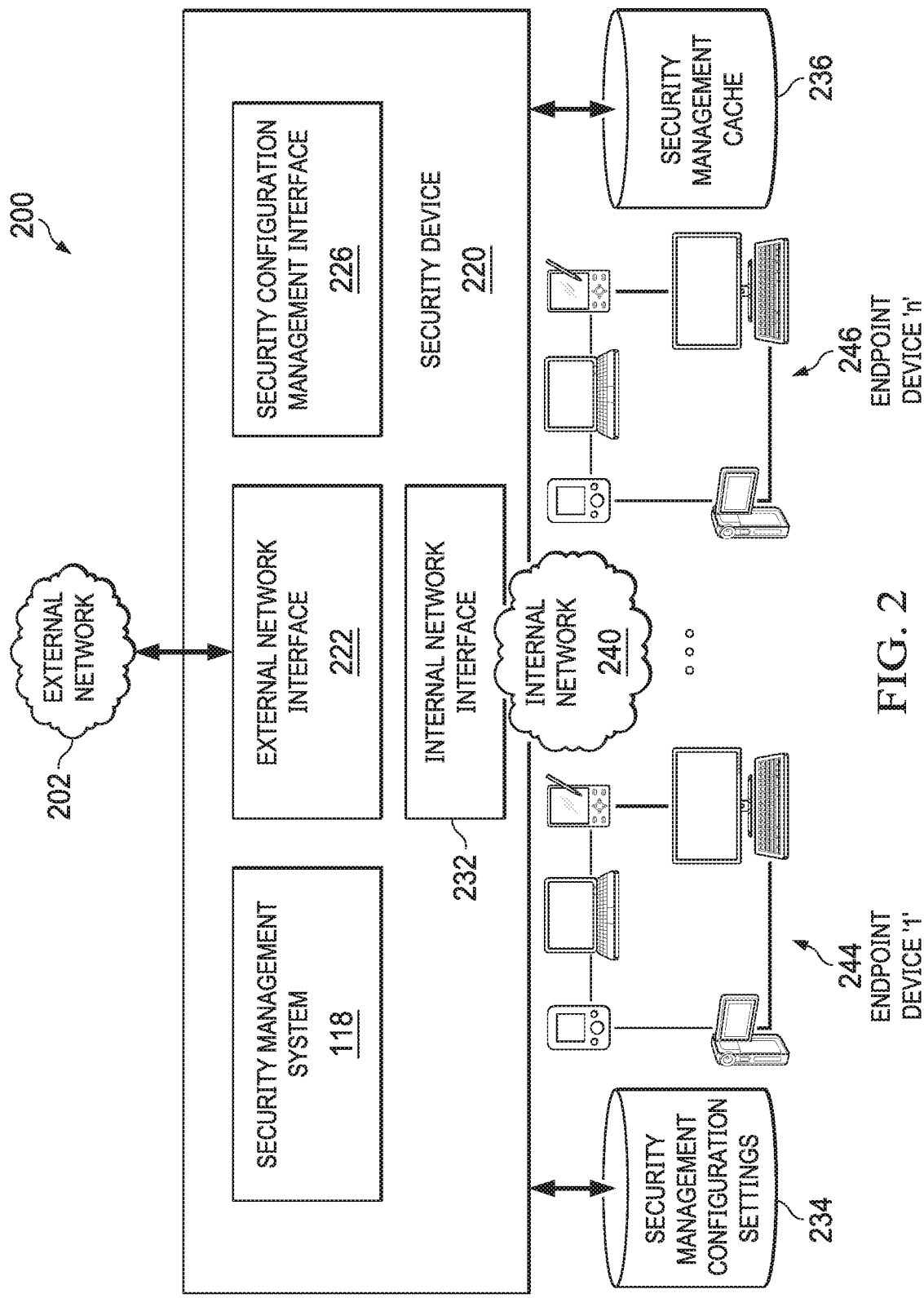
FIG. 2 illustrates a block diagram of a system for performing protocol independent forwarding of traffic for a content inspection service, in accordance with embodiments of the present disclosure.

In various embodiments, security management system 118 may be configured to enable protocol independent forwarding of traffic to a content inspection service (e.g., within external network 202 or internal network 240 shown in FIG. 2) by injecting custom header information into a header (e.g., a Transport Communication Protocol (TCP) header) of each of one or more datagrams of traffic, as described in greater detail elsewhere in this disclosure. In particular, security management system 118 may be configured to, responsive to receipt of an attempted connection between a client device (e.g., an endpoint device 244 or 246 shown in FIG. 2) and a server within external network 202, redirect the connection to a proxy for performing the content inspection service and may inject custom header information into the beginning of the stream of traffic for the connection. Such custom header information may include Internet Protocol information, port information, and/or other information regarding the original connection (e.g., prior to redirection to the proxy). The custom header information may also include identifying information associated with the client device (e.g., source address, user information, key identifier, etc.) which may provide additional information for the proxy/content inspection service to apply security policy for traffic of the connection. Further, security management system 118 may encrypt the injected header information using a user-specific key which user-specific key, may be identified by a user identifier, key identifier (e.g., that identifies a particular key from a plurality of keys associated with a user), and/or other suitable information, such that the proxy/content inspection service may apply a decryption key based on the user identifier, key identifier, and/or other suitable information in order to read the encrypted header information and apply appropriate security policy.

In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 improves the functionality of information handling system 100 and provides a useful and concrete result of improving network security by enabling protocol independent forwarding of traffic by a content inspection service, thus allowing offloading of content inspection of network traffic from a firewall or other security device in order make policy decisions with respect to the traffic, while preventing the communication of sensitive user information over a network.

FIG. 2 illustrates a block diagram of a system 200 for performing protocol independent forwarding of traffic for a content inspection service, in accordance with embodiments of the present disclosure. In some embodiments, a security device 220 may include an external network interface 222, a security configuration management interface 226, an internal network interface 232, and a security management system 118. Security device 220 may be implemented using any suitable information handling system 100, including without limitation a firewall, an intrusion prevention system, an intrusion detection system, or any other suitable security device capable of implementing security management system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to perform application-based content inspection for network communication. Known approaches for performing content inspection include inspecting content within security device 220. However, such an approach may require significant processing resources for security device 220. Another known approach is to redirect network traffic for inspection by an external proxy. In many existing redirection solutions, software performing redirection may modify protocol-specific payload in order to provide additional information for the proxy performing content inspection. Due to such modification, the component performing redirection must be application aware and support to each protocol must be individually implemented by such component. The data to be redirected has typically privacy needs and it may need to be encrypted. In existing solutions, either sensitive data is leaked or encryption needs to be performed on a per-attribute basis.

However, security management system 118 as disclosed herein may overcome these disadvantages by applying a protocol-independent header at the beginning of a connection, thus allowing security management system 118 to implement redirection independent of protocol while still providing information necessary for the proxy/content inspection service to implement an application-specific and/or user-specific policy. As redirection does not need to modify or understand any particular protocol, the solution proposed herein may work with encrypted protocols as well not-yet-existing protocols that may be defined in the future.

In operation, security management system 118 may, responsive to receipt of an attempted connection between a client device (e.g., an endpoint device 244 or 246) and a server within external network 202, redirect the connection to a proxy for performing the content inspection service and may inject custom header information into the beginning of the stream of traffic for the connection. Such custom header information may include Internet Protocol information, port information, and/or other information regarding the original connection (e.g., prior to redirection to the proxy). The custom header information may also include identifying information associated with the client device (e.g., source address, user information, key identifier, etc.) which may provide additional information for the proxy/content inspection service to apply security policy for traffic of the connection. Further, security management system 118 may encrypt the injected header information using a user-specific key, which user-specific key may be identified by a user identifier, key identifier, and/or other suitable information, such that the proxy/content inspection service may apply a decryption key based on the user identifier, key identifier, and/or other suitable information in order to read the encrypted header information and apply appropriate security policy. Security management system 118 may also include functionality such as that described with respect to method 300, described in detail below.

Figure 3:
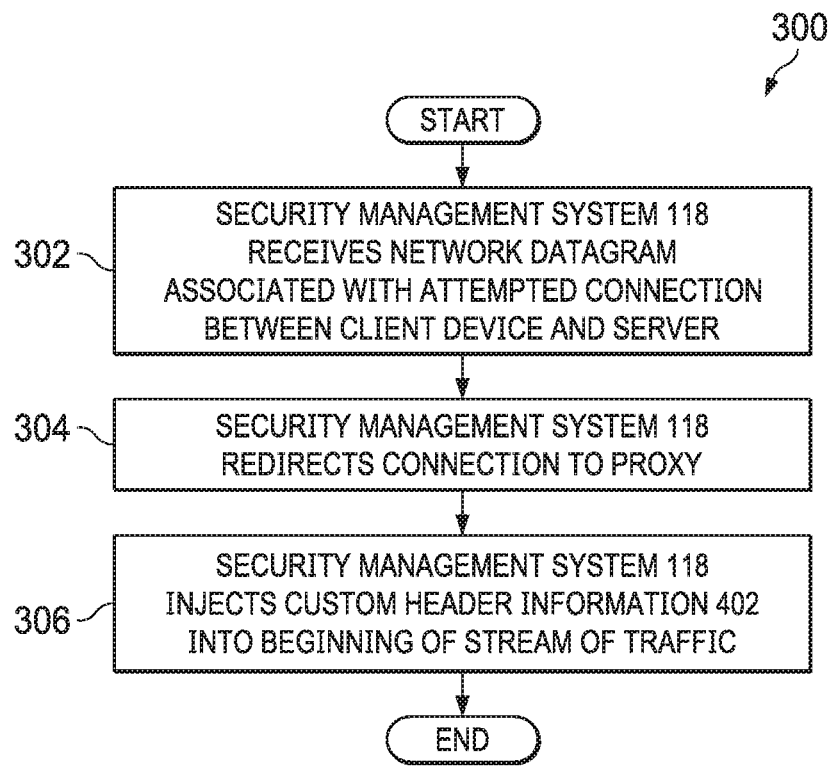
FIG. 3 illustrates a flow chart of an example method for performing protocol independent forwarding of traffic for a content inspection service, in accordance with embodiments of the present disclosure.

FIG. 3 illustrates a flow chart of an example method 300 for performing protocol independent forwarding of traffic for a content inspection service, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

Figure 4:
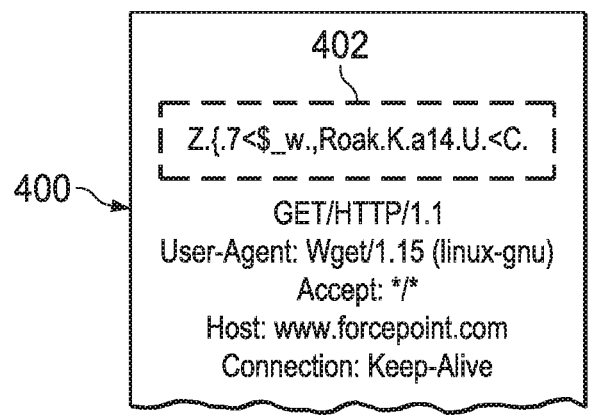
FIG. 4 illustrates an example TCP header of a datagram of traffic, in accordance with embodiments of the present disclosure.

FIG. 4 illustrates an example TCP header 400 of a datagram of traffic, in accordance with embodiments of the present disclosure. FIG. 4 and example TCP header 400 are discussed along with FIG. 3 and method 300 to further illustrate operation of method 300.

At step 302, security management system 118 may receive a network datagram associated with an attempted connection between a client device (e.g., an endpoint device 244 or 246) and a server within external network 202. At step 304, security management system 118 may redirect the connection to a proxy for performing a content inspection service and/or other security task. In some embodiments, such redirection may include applying a source network address table for outgoing connections, which may hide a source address, to the client device of the original connection.

At step 306, security management system 118 may inject custom header information 402 into the beginning of the stream of traffic for the connection as depicted in FIG. 4. Such custom header information may include Internet Protocol information, port information, and/or other information regarding the original connection (e.g., prior to redirection to the proxy). The custom header information may also include identifying information associated with the client device (e.g., source address, user information, key identifier, etc.) which may provide additional information for the proxy/content inspection service to apply security policy for traffic of the connection. Further, security management system 118 may encrypt the injected header information using a user-specific key, which user-specific key may be identified by user identifier, key identifier, and/or other suitable information, such that the proxy/content inspection service may apply a decryption key based on the user identifier, key identifier, and/or other suitable information in order to read the encrypted header information and apply appropriate security policy.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, security management system 118 executing thereon, and/or any other system operable to implement method 300. In certain embodiments, method 300 may be implemented partially or fully in software and/or firmware embodied in computer-readable media.

Although the foregoing contemplates that security management system 118 resides in security device 220, in some embodiments, security management system 118 may be implemented by a device external to security device 220, including without limitation a device within external network 202. In yet other embodiments, the functionality described above, particularly that of method 300, may be implemented within a client device.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A computer-implemented method for managing network communication, comprising:
    responsive to an attempted connection from a client to a server for establishing communications between the client and the server:
        redirecting the connection to a proxy; and
        injecting protocol-independent header information into a datagram as an encrypted portion of the datagram at a beginning of a Transmission Control Protocol (TCP) stream of traffic between the client and the server, the protocol-independent header information including information based upon which the proxy enforces a security policy, wherein the protocol-independent header information includes identifying information associated with the client and is encrypted with a user-specific key.

2. The method of claim 1, wherein the security policy relates to a content inspection service performed by the proxy.

3. The method of claim 1, wherein the user-specific key is defined by user-specific information within the protocol-independent header information, such that the user-specific information is usable by the proxy to decrypt the protocol-independent header information.

4. The method of claim 3, wherein encrypting the protocol-independent header information with the user-specific key comprises encrypting the protocol-independent header information with a key selected from a plurality of keys associated with a user, wherein the user-specific key selected from the plurality of keys is defined by a key identifier associated with the user within the protocol-independent header information.

5. A system comprising:
    a processor; and
    a non-transitory, computer-readable storage medium embodying instructions executable by the processor for:
        responsive to an attempted connection from a client to a server for establishing communications between the client and the server:
            redirecting the connection to a proxy; and
            injecting protocol-independent header information into a datagram as an encrypted portion of the datagram at a beginning of a Transmission Control Protocol (TCP) stream of traffic between the client and the server, the protocol-independent header information including information based upon which the proxy enforces a security policy, wherein the protocol-independent header information includes identifying information associated with the client and is encrypted with a user-specific key.

6. The system of claim 5, wherein the security policy relates to a content inspection service performed by the proxy.

7. The system of claim 5, wherein the user-specific key is defined by user-specific information within the protocol-independent header information, such that the user-specific information is usable by the proxy to decrypt the protocol-independent header information.

8. The system of claim 7, wherein encrypting the protocol-independent header information with the user-specific key comprises encrypting the protocol-independent header information with a key selected from a plurality of keys associated with a user, wherein the user-specific key selected from the plurality of keys is defined by a key identifier associated with the user within the protocol-independent header information.

9. A non-transitory, computer-readable storage medium embodying computer executable instructions configured for:
    responsive to an attempted connection from a client to a server for establishing communications between the client and the server:
        redirecting the connection to a proxy; and
        injecting protocol-independent header information into a datagram as an encrypted portion of the datagram at a beginning of a Transmission Control Protocol (TCP) stream of traffic between the client and the server, the protocol-independent header information including information based upon which the proxy enforces a security policy, wherein the protocol-independent header information includes identifying information associated with the client and is encrypted with a user-specific key.

10. The computer-readable storage medium of claim 9, wherein the security policy relates to a content inspection service performed by the proxy.

11. The computer-readable storage medium of claim 9, wherein the user-specific key is defined by user-specific information within the protocol-independent header information, such that the user-specific information is usable by the proxy to decrypt the protocol-independent header information.

12. The computer-readable storage medium of claim 11, wherein encrypting the protocol-independent header information with the user-specific key comprises encrypting the protocol-independent header information with a key selected from a plurality of keys associated with a user, wherein the user-specific key selected from the plurality of keys is defined by a key identifier associated with the user within the protocol-independent header information.

13. The method of claim 1, wherein the security policy is a user-specific security policy.

14. The method of claim 1, wherein the security policy is an application-specific security policy.

15. The system of claim 5, wherein the security policy is a user-specific security policy.

16. The system of claim 5, wherein the security policy is an application-specific security policy.

17. The computer-readable storage medium of claim 9, wherein the security policy is a user-specific security policy.

18. The computer-readable storage medium of claim 9, wherein the security policy is an application-specific security policy.

\* \* \* \* \*